Dec. 1, 1953     F. O. ROSHKO     2,660,754
CRAYFISH PICKING MACHINE
Filed Aug. 20, 1951
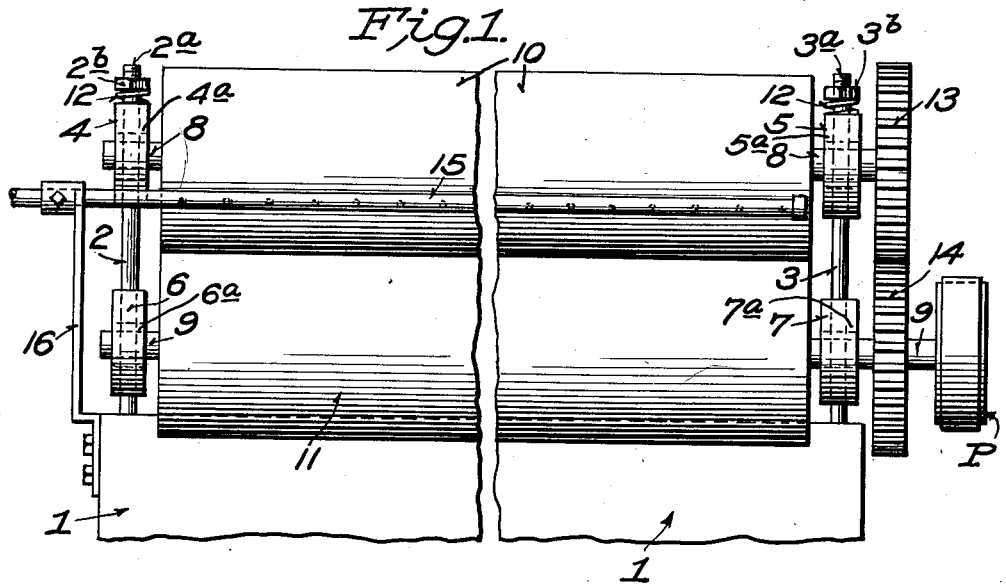
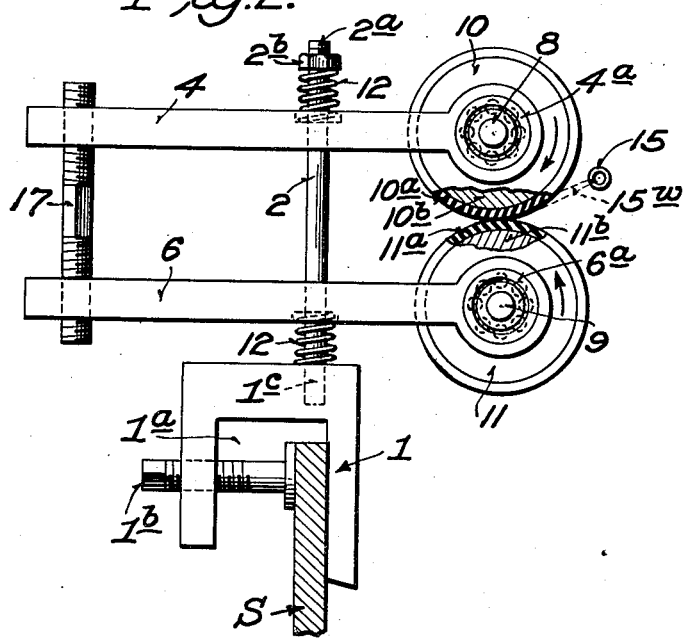
INVENTOR
Frank Oliver Roshko
BY
Alexander Dowell
ATTORNEYS

UNITED STATES PATENT OFFICE 2,660,754

CRAYFISH PICKING MACHINE

Frank O. Roshko, New Orleans, La.

Application August 20, 1951, Serial No. 242,736

4 Claims. (Cl. 17—2)

My invention is an improved form of crayfish picking machine intended to provide maximum efficiency in the recovering of meat from the crayfish hulls, and intended to perform its desired function with a minimum mutilation of the meat.

It is the object of my invention to provide a machine having upper and lower parallel rollers between which the deheaded crayfish are fed, the fish being introduced tail-first into the crotch of the rollers which crotch is formed by the forward mutual peripheries of the two rollers in the vicinity of the line of contact therebetween. These rollers are power driven in unison at the proper speed for providing maximum efficiency of operation.

A very important object of my invention is to provide a machine wherein the meat, once squeezed out and separated from the hulls, is immediately washed clear of the rollers by a specially directed jet of water so that the meat will have a minimum tendency to follow the hulls through the rollers. In my machine, the rollers are disposed horizontally, with one roller above the other and slightly behind it to facilitate feeding the machine. The spray of water is directed against the lower forward periphery of the upper roller so that the water is imparted a downward motion transverse to the axes of the rollers whereby the meat, when separated from the hulls, will be immediately washed out and thrown down over the lower roller and into a catch bin therebelow. Some prior art machines have provided a stream longitudinally directed along the crotch of the rollers, but such a stream is to be avoided since it tends to carry the separated meat back into the crotch where it is likely to be mutilated by the rollers. Moreover, the transversely directed stream does a better job of washing pieces of hull and bits of scum from the rollers as they revolve.

It is a further object of this invention to provide yieldable means to urge the rollers together. Such means must be adjustable since the proper squeezing pressure between rollers is necessary to insure efficient separation of the meat from the hulls. On the other hand, if the machine is to be effective when used on various sizes of crayfish, it is essential that the rollers be capable of separating different distances to accommodate the various sizes and toughnesses of crayfish hulls. It is therefore necessary to permit separation of the rollers while simultaneously maintaining the correct pressure for urging the rollers toward each other, the rollers being power driven in synchronism at all times.

In my machine the rollers are tilted back slightly to permit easier feeding of the machine than would be possible if the rollers were placed directly over one another in a vertical position. This is done by tilting the mounting board at about a five or six degree angle from the vertical. If tilted at more than about ten degrees the meat tends to lodge in the crotch of the rollers after separation from the hulls thereby mutilating the meat and requiring a large and wasteful stream of water to dislodge the meat from the crotch and wash the same over the lower roller toward the person feeding the machine.

Other objects and advantages of my invention will become apparent during the following discussion of the drawings wherein:

Fig. 1 is a front elevation of my crayfish picking machine.

Fig. 2 is a side elevation on a reduced scale of my machine showing the rollers partially in section.

Referring now to these figures, my machine comprises a mounting 1 having an inverted longitudinal channel 1a adapted to receive and be mounted on some convenient support S. A screw 1b is threaded in the mounting 1 and extends into the channel 1a and is normally tightened against the support S to lock the mounting 1 thereon.

At each end of the mounting 1 is an upwardly extending rod 2 and 3. These two rods are threaded as at 2a and 3a at their upper ends and are supported at their lower ends in holes 1c in the mounting 1.

The rods 2 and 3 respectively extend through pairs of arms 4 and 6 and 5 and 7. At the outer end of each of these arms is a bearing 4a, 6a, 5a, and 7a, respectively. A shaft 8 is journaled in the bearings 4a and 5a, and a shaft 9 is journaled in the bearings 6a and 7a, and these shafts carry the crayfish peeling rollers 10 and 11, respectively. These rollers comprise outer covers 10a and 11a, and inner cores 10b and 11b, the former being of resilient material. Note in Fig. 2 that the upper roller 10 is not directly over the lower roller 11 but is a little behind it for the purpose hereinafter discussed.

Upper and lower sets of springs 12 serve to yieldably urge the arms and associated rollers together, the nuts 2b and 3b serving to adjust their pressure. The outer ends of the arms 4, 5, 6 and 7 are positioned by screws 17 having upper and lower reversed-thread portions.

At one end of the shaft 9 is located a drive means, such as a pulley P, to impart rotation to the roller 11, and adjacent the pulley are located upper and lower spur gears 13 and 14 which serve to drive the roller 10 in synchronism with the roller 11. The teeth on the gears 13 and 14 are somewhat longer, radially, than is customary on standard gears to provide positive engagement even when the rollers are somewhat separated.

A water tube 15 is disposed across the front of the machine parallel to the rollers and spaced therefrom and has inwardly facing jet openings intended to direct a strong spray of water 15w against the forward lower periphery of the roller 10 for the purpose hereinafter discussed. The tube 15 may be supported on a bracket 16 as shown in Fig. 1.

The operation of the machine is as follows: A continuous rotation is imparted to the rollers 10 and 11 by the pulley P, and these rollers rotate so that, as viewed from the front, the surfaces adjacent the crotch are receding from the operator. The crayfish are fed into the crotch one at a time tail-first, their heads having first been removed by hand. The amount of pressure urging the rollers 10 and 11 together is preset by adjusting the nuts 2b and 3b and must be sufficient to crack the tougher hulls and squeeze out the meat without being so great as to completely squash the whole crayfish and mutilate the meat therein. The adjustment of the spring pressure is very important to obtain optimum results.

As the crayfish enters the crotch, the hull is cracked and opened with a motion that loosens the meat, and the spray 15w is so directed that it washes the meat out of the hull, thus assisting the squeezing-out action of the rollers; and once the meat is free, the water washes it down over the lower roller 11 and away from the machine, thus preventing any unnecessary mutilation of the separated meat by the rollers. The meat is caught on the forward side of the machine by a bin, not shown, and the hulls are caught in a trough or container, not shown, at the rear of the rollers after passing therebetween.

I claim:

1. A crayfish picking machine for separating the meat from the hulls thereof comprising, a frame having an upper and a lower roller-mounting member; upper and lower parallel horizontally disposed rollers mounted one substantially vertically above the other on said members; adjustable tensioning means between said mounting members yieldably urging said members and associated rollers together to form a crotch between said rollers; drive means operatively connected with both rollers for positively rotating said rollers in opposite directions at a uniform rate; and water jet spraying means in front of the crotch substantially parallel with the lower forward peripheral portion of the upper roller and having jet openings directed toward the peripheral portion of said upper roller between said spraying means and said crotch.

2. In a machine as set forth in claim 1, said upper roller being disposed slightly behind said lower roller.

3. A crayfish picking machine for separating the meat from the hulls thereof comprising, a frame; upper and lower horizontally disposed mutually parallel rollers mounted one above the other on said frame; adjustable tensioning means between said rollers yieldably urging the latter together to form a crotch therebetween; drive means operatively connected with both rollers for positively rotating said rollers in opposite directions at a uniform rate; and water jet spraying means along the length of said crotch substantially parallel with the lower forward peripheral portion of the upper roller and having jet openings directed toward the peripheral portion of said upper roller between said spraying means and said crotch, said jet being directed against the lower forward periphery of the upper roller and downwardly into the hull to wash the meat therefrom and conduct the meat away from the crotch.

4. In a machine as set forth in claim 3, said upper roller being disposed slightly behind said lower roller.

FRANK O. ROSHKO.

References Cited in the file of this patent

UNITED STATES PATENTS

| Number | Name | Date |
|---|---|---|
| 937,270 | Aikele, Jr. | Oct. 19, 1909 |
| 1,615,081 | Hardie | Jan. 18, 1927 |
| 1,793,189 | Peters | Feb. 17, 1931 |
| 2,477,289 | De Moss | July 26, 1949 |
| 2,574,044 | Lapeyre et al. | Nov. 6, 1951 |